US012565922B2

(12) United States Patent
Stromberg et al.

(10) Patent No.: US 12,565,922 B2
(45) Date of Patent: Mar. 3, 2026

(54) TENSIONER OF A TIGHTENER FOR A CHAIN, STRAP, CABLE OR THE LIKE

(71) Applicant: TDS GMBH, Dortmund (DE)

(72) Inventors: Tom Stromberg, Dortmund (DE); Nils Stiepermann, Dortmund (DE)

(73) Assignee: TDS GMBH, Dortmund (DE)

( * ) Notice: Subject to any disclaimer, the term of this patent is extended or adjusted under 35 U.S.C. 154(b) by 540 days.

(21) Appl. No.: 18/021,084

(22) PCT Filed: Apr. 12, 2021

(86) PCT No.: PCT/EP2021/059394
§ 371 (c)(1),
(2) Date: Feb. 13, 2023

(87) PCT Pub. No.: WO2022/037810
PCT Pub. Date: Feb. 24, 2022

(65) Prior Publication Data
US 2023/0323932 A1     Oct. 12, 2023

(30) Foreign Application Priority Data
Aug. 19, 2020    (DE) ........................ 202020104814.7

(51) Int. Cl.
*F16G 11/00*          (2006.01)
*F16G 11/12*          (2006.01)
(52) U.S. Cl.
CPC .................................... *F16G 11/12* (2013.01)

(58) Field of Classification Search
CPC ........ F16G 11/12; F16B 7/1463; F16B 7/025; F16B 7/06; F16B 2007/16; Y10T 403/32501
USPC ........................................................ 410/100
See application file for complete search history.

(56) References Cited

U.S. PATENT DOCUMENTS

| | | | | |
|---|---|---|---|---|
| 4,131,264 A | * | 12/1978 | Patterson, III | .......... F16G 11/12 24/68 CT |
| 10,605,284 B2 | | 3/2020 | Taneichi | |
| 10,995,786 B2 | * | 5/2021 | Didehvar | ................ F16B 7/025 |
| 11,333,220 B2 | | 5/2022 | Redder | |

FOREIGN PATENT DOCUMENTS

| | | |
|---|---|---|
| DE | 2310152 A | 9/1974 |
| EP | 2301816 B | 8/2014 |

* cited by examiner

*Primary Examiner* — Steven O Douglas
(74) *Attorney, Agent, or Firm* — Andrew Wilford

(57) ABSTRACT

The invention relates to a tensioning device for tensioning tensioning means such as chains, straps, ropes, threaded rods or the like, which is fitted with at least one tubular tensioning nut (4a, 4b) and at least one threaded bolt (2) which is inserted into the tensioning nut (4a, 4b) and interacting therewith. According to the invention, the tensioning nut (4a, 4b) is divided longitudinally into at least two tensioning nut halves (4a, 4b) and comprises at least one guide opening (5a, 5b) which interacts with a guide pin (6) for radially acting upon the two tensioning nut halves (4a, 4b).

17 Claims, 4 Drawing Sheets

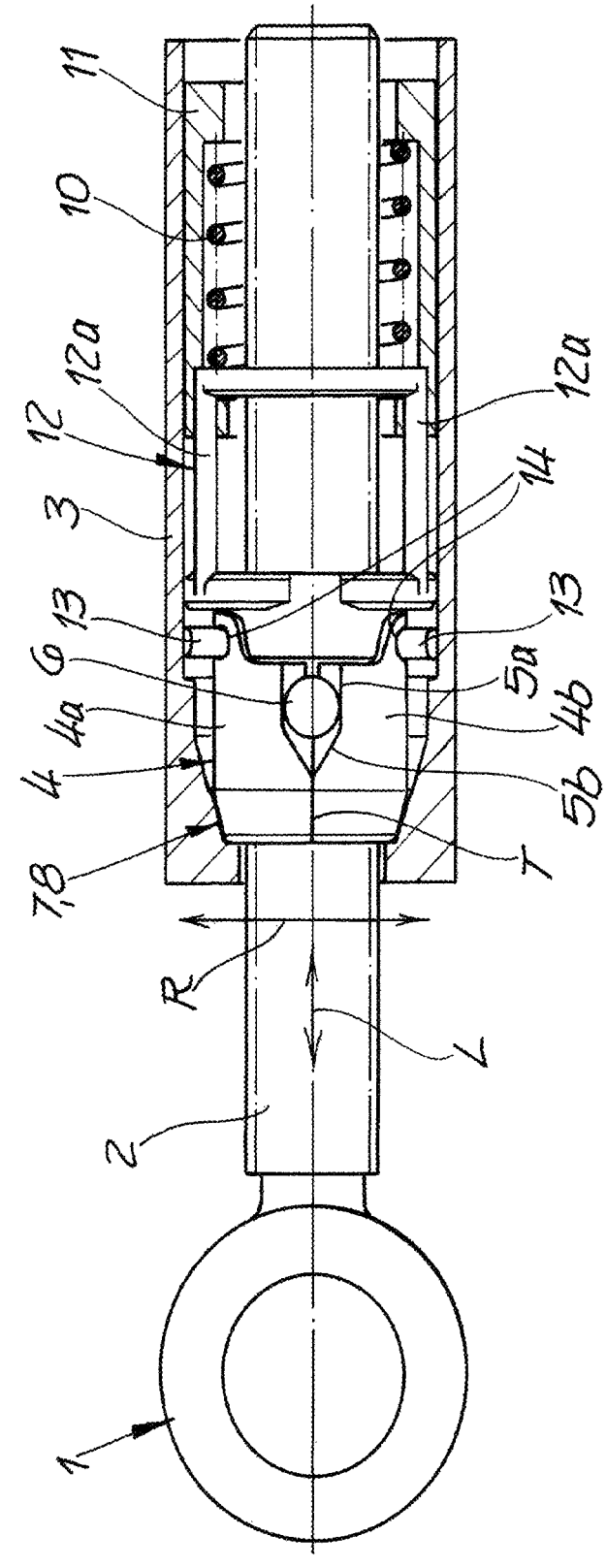
_Fig.1_

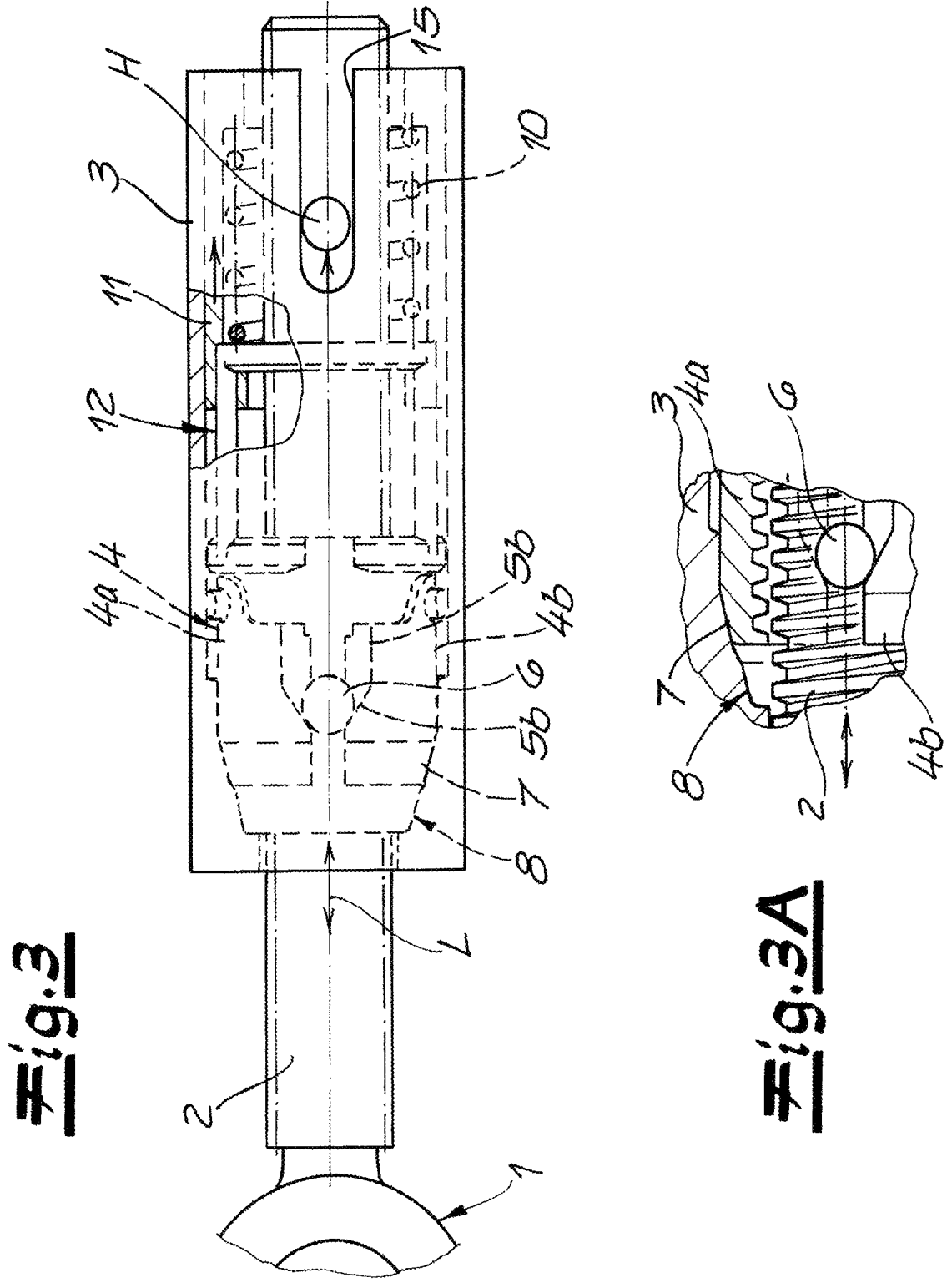

TENSIONER OF A TIGHTENER FOR A CHAIN, STRAP, CABLE OR THE LIKE

CROSS REFERENCE TO RELATED APPLICATIONS

This application is the US-national stage of PCT application PCT/EP2021/059394 filed 12 Apr. 2021 and claiming the priority of German patent application 20 2020 104 814.7 itself filed 19 Aug. 2020.

FIELD OF THE INVENTION

The invention relates to a tensioner of a tightener for a chain, strap, cable, threaded rod or the like and having at least one tubular tightening nut and at least one threaded bolt threaded into the tightening nut.

BACKGROUND OF THE INVENTION

Tighteners for chain, strap, cable or the like are used in the context of the generic teaching according for example to WO 2018/073098 [U.S. Pat. No. 11,333,220] in the lifting and transport technology or generally in the logistics area. For example, the chains, cables or tapes in question can be used for securing loads, for example on a truck. For this purpose, the tie-down element in question, for example the chain, cable or tape, is coupled at one end to a transport surface, while the other end is acted upon by the tensioner in order to fix the load to be secured in this way on the load surface. This has proven successful in principle.

In addition to the prior art already referred to above and generic according to WO 2018/073098, comparable tensioners are also used in conjunction with cable hardware according to EP 2 301 816.

Irrespective of this, DE 2 310 152 discloses a tightener, in particular a wire and shroud tightenener. It consists of a tubular nut into each end of which a threaded bolt is screwed. The two screw threads are opposite and tightening takes place by rotating the threaded sleeve relative to the bolts. In addition, the screw threads are of different diameters, and the larger of the threaded bolts is screwed into the larger-diameter screw thread of the tube.

In principle, the prior art has proven successful if it is concerned, for example, with securing or tying down a load on the load surface of a transport vehicle. However, in this context, more or less large tightening movements must often be executed in order, for example, to compensate for slack of the tie-down element. This is only possible with considerable effort with the previously existing tensioners because the threaded bolt has to be screwed into the tubular tightening nut receiving it. This is what the invention relates to.

OBJECT OF THE INVENTION

The object of the invention is to further develop such a tensioner of a tightener of a chain, strap, rope or the like in such a way that a big tightening movement can be executed in a simple and rapid manner or any slack of the tie-down element can be controlled without problems.

SUMMARY OF THE INVENTION

To attain this object, a tensioner of the generic type for a tightener of a chain, strap, rope or the like in the context of the invention is characterized in that the tightening nut is axially divided into at least two shells and has at least one guide hole fittable with a (stationary) guide pin for radially actuating the two shells.

Due to the fact that the tightening nut is axially divided into at least two parts, there is the basic possibility of being able to represent different functional states. In fact, the tightening nut in a first position allows a normal screwing-in of the threaded bolt. For this purpose, the two shells rest against one another in the region of their parting plane and the inner screw thread of the tightening nut engages in the corresponding external thread of the threaded bolt screwed into the tightening nut. In the context of a second and third position, the tightening nut is open. For this purpose, the two shells are each acted upon radially. For this purpose also, the guide pin engages in the guide hole and thereby ensures the desired radial loading of both shells.

The two aforementioned positions can be distinguished in that, in the second position, the two shells are each acted upon radially against the force of a spring which brings the two shells again into contact with the thread of the threaded bolt after the radial expansion of the shells caused by the pressing of the threaded bolt.

In contrast, the third position is characterized in that the tightening nut is acted upon continuously and by fixing the spring in such a way that the two shells are radially spaced apart from one another, so that in this state the threaded bolt can be pushed back and forth with respect to the tightening nut or the two spaced-apart shells. As a result, a quick adjustment can be effected as a whole, either in the context of the second position, taking into account one or more skipped thread turns or according to the third position, in that the thread turn for the subsequent engagement can be predefined practically completely flexibly. The essential advantages are to be seen herein.

In order to realize the above-described functionality in detail, two opposing guide holes are generally provided. In most cases, two opposite stationary guide bolts are also provided. The two opposite stationary guide pins each engage in a respective adjacent respective guide hole. As soon as the tightening nut is moved axially, there is an interaction between the relevant guide pin and the guide hole. As a result, both shells can be acted upon radially, so that, as a result of their spacing from the threaded bolt engaged therein, the threaded bolt can be displaced linearly.

In order to realize this in detail, the respective guide hole is generally formed in two parts with a guide region and a spreading region. As a rule, the guide region has a clear width adapted to the guide bolt. In contrast, the spreading region is generally configured to widen along the parting plane of the tightening nut. As a result, a relative movement between the respective stationary guide pin and the adjacent respective guide hole in the guide region corresponds to a situation in which the two shells are not acted upon radially. If, however, there is an interaction of the relevant guide pin with the spreading region of the guide hole, the two shells are thereby acted upon radially and spread apart so that the two shells cannot engage or engage in the external thread of the threaded bolt with their inner threads. In this case, the threaded bolt can accordingly be displaced axially with respect to the tightening nut.

According to a further advantageous embodiment, the tightening nut fits into a seat of an outer sleeve. As a rule, the outer sleeve is, as a rule, also designed like a tubular tightening nut and receives in its interior the tightening nut and consequently also the threaded bolt threaded into the tightening nut. The seat in the outer sleeve is typically equipped with a contact region for a mating contact region of the tightening nut. The contact region is generally a frustoconical seat of the outer sleeve or in the interior of the seat of the outer sleeve. In contrast, the mating contact region is generally formed as a frustoconical surface of the tightening nut.

In this way, there is an interaction between the frustoconical surface of the tightening nut on the one hand and the frustoconical seat in the interior of the outer sleeve on the other hand in the interior of the outer sleeve. As long as the frustoconical surface of the tightening nut is engaged in the frustoconical seat of the outer sleeve, the tightening nut is closed and the two shells rest against one another along the parting plane. On the other hand, movement of the tightening nut into a widened region adjoining the seat in the interior of the outer sleeve corresponds to a situation in which the tightening nut can spread in this widened region, specifically in that the two shells are acted upon radially.

The spring, which acts upon the tightening nut and has already been mentioned above, now ensures that the tightening nut is biased by this spring toward the seat in the outer sleeve. For this purpose, the spring is regularly braced against a spring sleeve surrounding it. The spring sleeve is in turn axially movable inside the outer sleeve. In this case, movability of the spring sleeve in the outer sleeve has proven to be particularly advantageous because as a result not only the spring sleeve but with it the spring and the tightening nut can be displaced linearly with respect to the outer sleeve and consequently the tightening nut can be displaced from the seat in the interior of the outer sleeve toward the widened region. As a result, the tightening nut can be shifted into the spread position by the displaceable spring sleeve. The shells that are each acted upon radially at this point consequently release the threaded bolt that in this position can be pushed back and forth as desired linearly with respect to the tightening nut. As a result, the quick adjustment already discussed above can be carried out.

In addition, the design is usually such that the spring acting on the tightening nut is generally compressed between the spring sleeve and a coupling element. In this case, the coupling element is usually coupled for joint axial movement with both shells. This means that any axial displacement of the tightening nut and thus of the two shells is transmitted to the spring via the coupling element. Thus the spring is compressed in the previously described second position, because in this case the spring sleeve retains its position in the interior of the outer sleeve and the tightening nut is moved together with the coupling element onto the spring. As a result, the spring is compressed.

On the other hand, in the third position, the spring sleeve displaced in this case together with the spring and the interposed coupling element overall ensures that the tightening nut is also displaced, that is to say emerges from the seat in the interior of the outer sleeve and is displaced into the widened region adjoining it. As a result, the tightening nut spreads and the two shells are consequently radially moved. As a result, the threaded bolt threaded into the tightening nut can subsequently be displaced axially.

In order to convert the previously mentioned axial displaceability of the two shells relative to the coupling element into the simultaneous possibility of radially moving the two shells in detail, the coupling element has radial pins. The radial pins of the coupling element engage in corresponding holes of the respective shells. As a result, the shells can move radially with respect to the coupling element, namely acted upon by the interaction of the guide pins with the respective guide holes. At the same time, the radial pins of the coupling element engaging in the pin hole ensure that the coupling element and the tightening nut or the two respective shells are coupled to one another for joint axial displacement.

As a result, a tensioner is provided for the tightener, such as chain, strap, rope or the like that is optimally adapted to the tightening process. Depending on the tightening path to be removed, three positions can be distinguished as a whole, as this tightening path can be limited or freed. In the first position, the tightening nut is closed with its two shells and the tensioning of the tie-down element takes place by screwing the threaded bolt into the tightening nut surrounding it.

In contrast, the second position corresponds to a situation in which the threaded bolt is pressed into the outer sleeve receiving the tightening nut. In this case, the tightening nut is spread against the force of the spring and the spring is tensioned at the same time. The threaded bolt, which has previously been driven by the tightening nut, consequently slides with its external thread in relation to the internal screw thread of the tightening nut until the spring acting on the tightening nut has ensured that the two shells are again brought into engagement with the threaded bolt.

The third position, which is still possible, corresponds to a situation in which the nut is axially displaced together with the spring in the interior of the outer sleeve, so that the two shells are thereby spread apart. This state can theoretically be maintained as long as the spring together with the nut retains the displaced position assumed in relation to the outer sleeve. As a result, the threaded bolt can be brought into any position relative to the tightening nut. The third position can be reversed at any time when the spring is displaced together with the tightening nut into its starting position and as a result the two previously spread shells are again applied to the threaded bolt. In this way, a need for rapid adjustment as well as fine adjustment is made available, which has not been previously known in this embodiment. The essential advantages are to be seen herein.

BRIEF DESCRIPTION OF THE DRAWING

The invention is described in more detail below with reference to a drawing showing only one embodiment. Therein:

FIG. 1 is a sectional view of the tensioner according to the invention in its starting position, FIGS. 3 and 3A shows a third position of the tensioner according to FIGS. 1 and 2 with an axially displaced nut and spring for quick adjustment of the threaded bolt.

SPECIFIC DESCRIPTION OF THE INVENTION

Figure 2A:
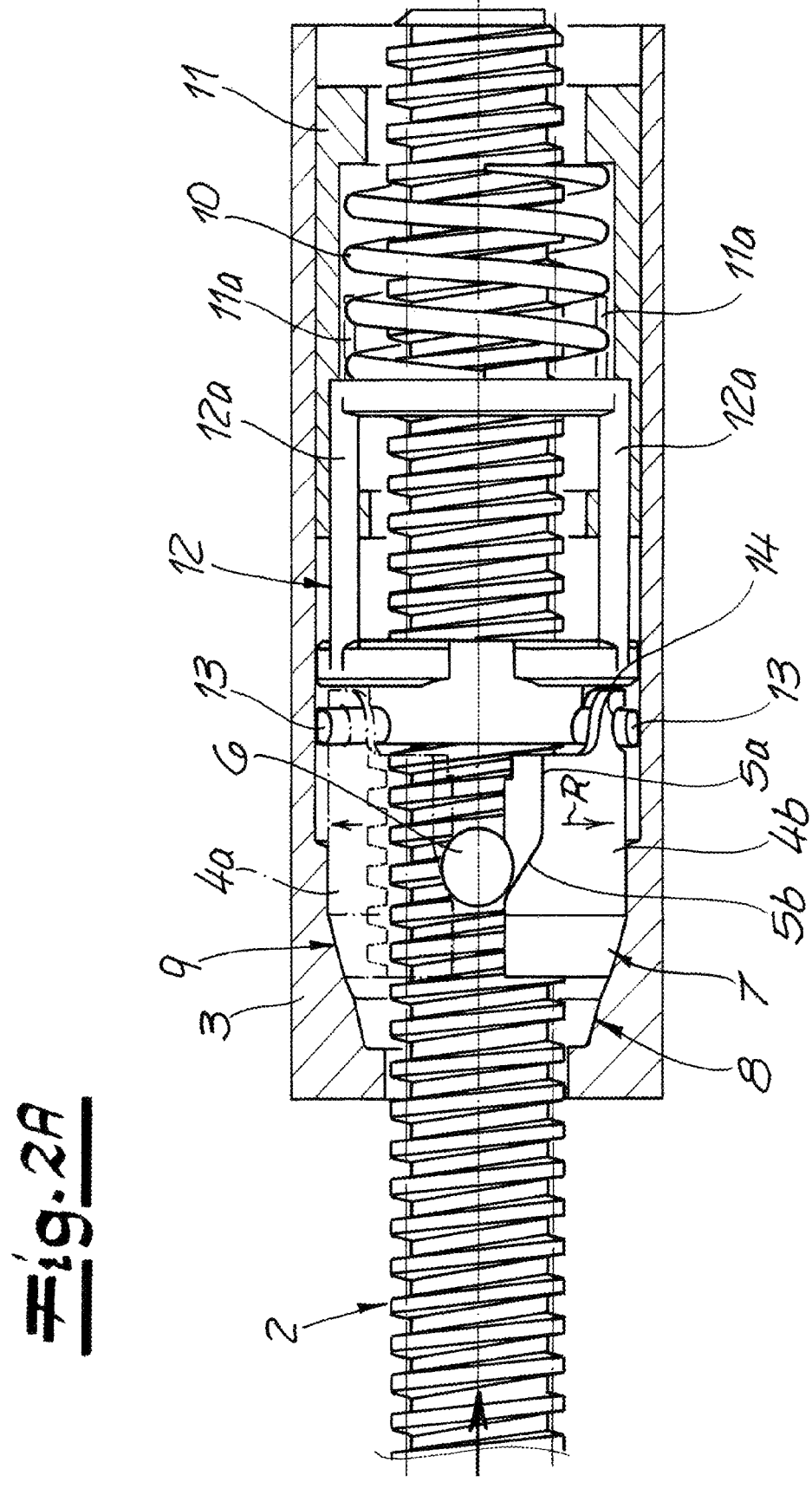
FIG. 2A shows a second position of the tensioner of FIG. 1 in a functional position with a threaded bolt fitted into the outer sleeve.

The drawing shows a tensioner of a tightener of a chain, strap, rope, threaded rod or the like. For this purpose, the illustrated tensioner may be equipped with an eyelet 1 shown only in FIG. 1 at one end of a threaded bolt 2. The tie-down element in question can be attached to or in the eyelet 1. In contrast, an outer sleeve 3 may be fixed to a load surface of a transport vehicle, so that movement of the threaded bolt 2 along its axis L indicated in FIG. 1 corresponds to a situation in which the tie-down element in question connected to the eyelet 1 is tensioned or slackened.

For this purpose, the threaded bolt 2 interacts with a tubular tightening nut 4a, 4b into which the threaded bolt 2 is fitted.

In fact, the interaction of the threaded bolt 2 with the tubular tightening nut 4a, 4b takes place in that the threaded bolt 2 has an external thread and the tightening nut 4a, 4b has a complimentary internal thread on its inner surface. As a result, the threaded bolt 2 can be fixed as shown in FIG. 1 as is standard in the tightening nut 4a, 4b, so that in this way the tie-down element connected to the eyelet 1 and not shown in detail is tensioned or slackened depending on the direction of rotation of the threaded bolt 2 with respect to the tightening nut 4a, 4b.

According to the invention and of particular importance the fact that the tightening nut 4a, 4b is axially divided into at least two shells 4a and 4b is now of particular importance. In fact, the two shells 4a and 4b lie against one another in the context of the position according to FIG. 1 and in the starting position or starting position, specifically along an axially extending parting plane T shown in FIG. 1. Furthermore, the tightening nut 4a, 4b has guide holes 5a, 5b into which fit guide pins 6. Relative axial movement between the stationary guide pins 6 and the guide holes 5a, 5b in the tightening nut 4a, 4b shifts the two shells 4a and 4b radially apart in direction R indicated in FIG. 1 perpendicular to the axial direction L.

In this embodiment, the tightening nut 4a, 4b is not only tubular, but has a frustoconical outer surface 7 on its front end that interacts with a complementary frustoconical inner seat 8 of the outer sleeve 3. For this purpose, the outer sleeve 3 is tubular, has on its front end the above-mentioned seat 8, and merges into a widened region 9 toward the rear end of the outer sleeve 3.

The frustoconical surface 7 on the other hand is formed on the front end of the tightening nut 4a, 4b. In the starting position shown in FIG. 1, the frustoconical surface 7 fits at the front end of the tightening nut 4a, 4b into the seat 8 of the front end of the outer sleeve 3 or in the seat provided in the outer sleeve 3 formed by the tubular shape of the outer sleeve 3. Since, according to the embodiment, the tightening nut 4a, 4b is provided with two diametrally opposite guide holes 5a, 5b there are also two corresponding stationary guide pins 6 that are also located opposite one another and each engage in a respective one of the adjacent respective guide holes 5a, 5b. It can be seen that each guide hole 5a, 5b is formed in two parts. In fact, there is a guide region 5a and a spreading region 5b.

The design of the guide region 5a of the guide hole 5a, 5b is selected such that the guide region 5a is a slot whose clear width approximately corresponds to a diameter of the respective pin-like or cylindrical guide bolt 6. On the other hand, the spreading region 5b extends obliquely to the parting plane T of the tightening nut 4a, 4b already discussed above.

For the basic construction, a spring 10 is also provided that biases the tightening nut 4a, 4b forward toward the seat 8 in the outer sleeve 3. The spring 10 in question is braced rearward against an inner spring sleeve 11 in the outer sleeve 3. In fact, the spring sleeve 11 can move along the axis L in the interior of the outer sleeve 3 and can be fixed in position as will be described in more detail below. For this purpose, the spring sleeve 11 may be equipped with a corresponding manual actuator H that can be seen in FIG. 3 and that extends through a slot in the outer sleeve 3.

The spring 10 is compressed overall between the spring sleeve 11 and a coupling element 12. According to the embodiment, the coupling element 12 is designed as a cage and couples the spring 10 or the spring sleeve 11 to the tightening nut 4a, 4b. In addition, the coupling element 12 is axially coupled to the two shells 4a and 4b and to the spring sleeve 11. For this purpose, the coupling element 12 has guide webs 12a that fit in guide slots 11a of the spring sleeve 11.

Thus, movement of the coupling element 12 along the axis L effects movement along the axis L of the tightening nut 4a, 4b and also of the spring sleeve 11 and with it the (relaxed) spring 10. Moreover, it can be seen from the drawing that the coupling element 12 is axially shiftable in the spring sleeve 11.

As already explained, the coupling element 12 is coupled to the two shells 4a and 4b for joint axial movement therewith but at the same time permits movement of the two shells 4a and 4b in the radial direction R. For this purpose, the coupling element 12 carries radially extending pins 13 that engage in respective holes 14 of the respective tightening nut shells 4a and 4b. As a result, the two shells 4a and 4b can be spread apart in the radial direction R, without interfering with the axial coupling of the tightening nut 4a, 4b or of its two shells 4a and 4b to the coupling element 12.

The mode of operation is as follows:

Starting from FIG. 1 and the starting position shown there, the tie-down element connected to the eyelet 1 can be tensioned, for example, by screwing the threaded bolt 2 into the tightening nut 4a, 4b. In the starting position shown, the internal screw thread of the tightening nut 4a, 4b meshes with the external thread of the threaded bolt 2 so that corresponding screwing movements of the threaded bolt 2 are possible and correspond to the desired movement of the eyelet 1 along the axis L.

Figure 2B:
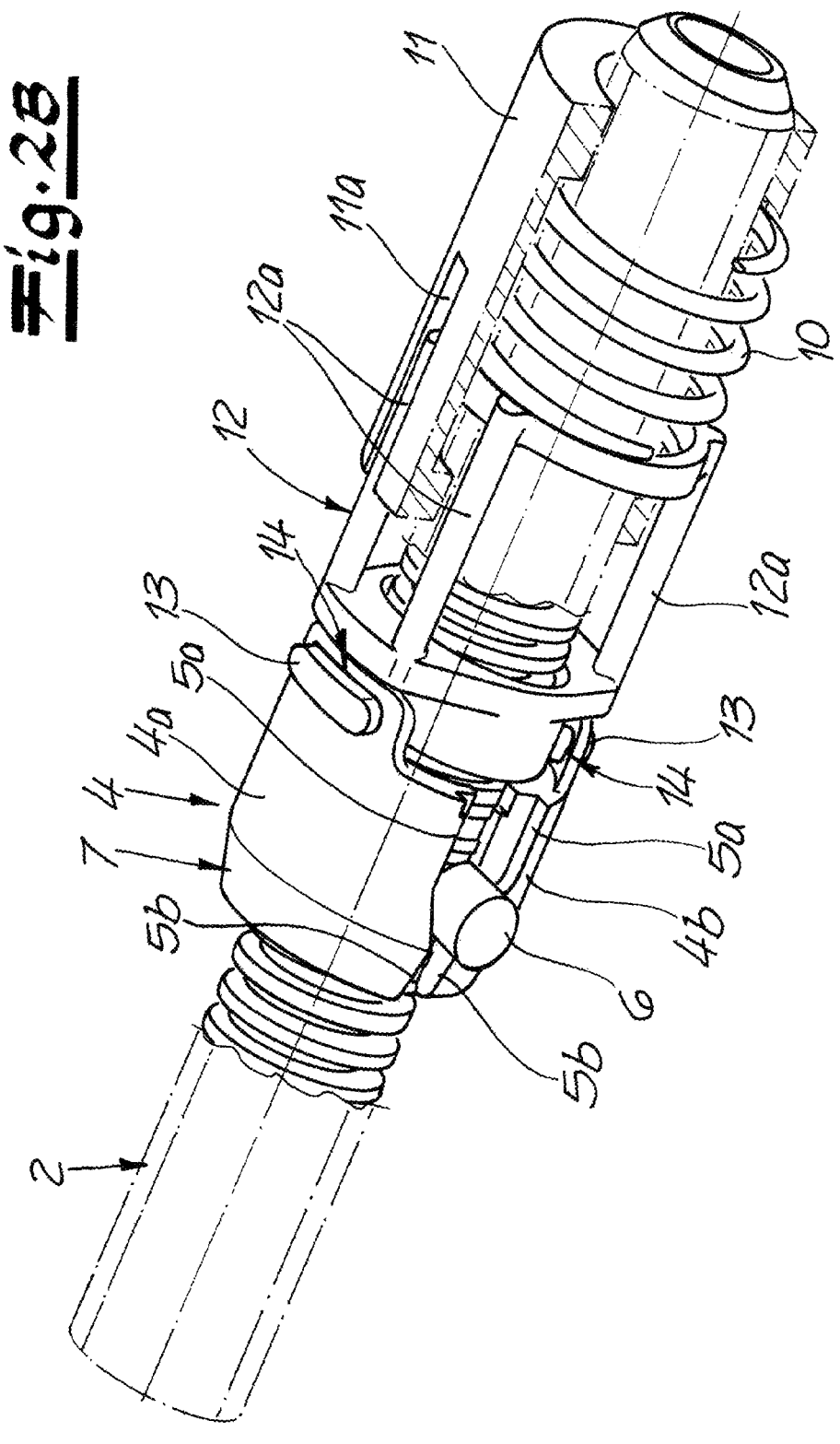
FIG. 2B is a perspective view of the tensioner according to FIG. 2A.

Within the scope of the second position illustrated in FIGS. 2A and 2B, a conditional rapid adjustment of the threaded bolt 2 and consequently of the eyelet 1 can now be carried out. For this purpose, starting from the starting position of FIG. 1, the threaded bolt 2 is pressed rearward into the outer sleeve 3, to the right as illustrated. Since the tightening nut 4a, 4b is in this case meshing with the threaded bolt 2, the tightening nut 4a, 4b follows this rearward movement and the pushing-in of the threaded bolt 2 into the outer sleeve 3. As a result, the two stationary guide pins 6 engage into the spreading region 5b of the guide hole 5a, 5b. Since the spreading region 5b widens rearward obliquely toward the parting plane T of the tightening nut 4a, 4b, the described movement of the tightening nut 4a, 4b toward the guide pins 6 leads to the tightening nut 4a, 4b being spread open, specifically in the radial direction R.

Accordingly, the two shells 4a and 4b are spaced radially from one another in the radial direction R and radially with respect to the parting plane T. As a result, the internal thread of the tightening nut 4a, 4b separates from the external thread of the threaded bolt 2 and consequently the threaded bolt 2 can move freely in the rearward direction (to the right). At the same time, the spring 10 has also been compressed because movement of the tightening nut 4a, 4b is followed by the coupling element 12 that slides into the spring sleeve 11, which in turn is fixed axially relative to the outer sleeve 3. For this purpose, the coupling element 12 has the longitudinal webs or guide webs 12a mounted so as to be axially displaceable in guides or guide slots 11a of the spring sleeve 11.

The compressed spring 10 now ensures that the tightening nut 4a, 4b is pressed forward to the left toward the seat 8 in the interior of the outer sleeve 3 and thus slides forward over the external thread of the threaded bolt 2. At the end of this movement, the threaded bolt 2 typically has moved rearward to the right by a thread turn and thereafter the tightening nut 4a, 4b has come directly into engagement with the threaded bolt 2 by the force of the previously compressed spring 10. For this purpose, the previously described second position corresponds to the conceivable functional state. In principle, two or more thread turns can thereby also be bridged.

The third position of the functional states now corresponds to the illustration in FIG. 3. Here, it can be seen that the spring sleeve 11 has been moved to the right with respect to the outer sleeve 3. This at the same time leads to the spring 10 and the coupling element 12 and thus finally the tightening nut 4a, 4b also being moved to the right with the spring sleeve 11 (by the manual actuator H). This may be done by this actuator H. As a result, the two stationary guide pins 6 can dip into the spreading region 5b of the guide hole 5a, 5b again and ensure that the two shells 4a and 4b are spread apart in the radial direction R. Since, in this process, the spring 10 has not been compressed, in the embodiment shown in FIG. 3 according to the third position, the functional state shown in the third position is maintained as long as desired and, as a result of the two shells 4a and 4b that are radially lifted with respect to the threaded bolt 2, the threaded bolt 2 and with it the eyelet 1 can be moved back and forth along the axis L.

This position can then be cancelled again when the spring sleeve 11 returns to the left into the starting or normal position of to FIG. 1 so that, as a result, the frustoconical surface 7 of the tightening nut 4a, 4b engages into the seat 8 and as a result the two shells 4a and 4b are closed together.

The invention claimed is:

1. A tensioner of a tightener of a chain, strap, rope, threaded rod or the like, the tensioner comprising:
   an outer sleeve forming a seat;
   at least one tubular tightening nut fitting in the seat of the outer sleeve; and
   at least one threaded bolt threaded into the tightening nut the tightening nut being axially divided into at least two shells and having at least one guide hole fittable with a guide pin for radial movement of the two shells.

2. The tensioner according to claim 1, wherein two diametrally opposite guide holes are provided.

3. The tensioner according to claim 2, further comprising:
   two diametrally opposite stationary guide pins each engaging in a respective one of the guide holes.

4. The tensioner according to claim 1, wherein the guide hole is formed in two parts with a guide region and a spreading region.

5. The tensioner according to claim 4, wherein the guide region has a clear width corresponding to a diameter of the guide pin.

6. The tensioner according to claim 4, wherein the spreading region extends obliquely to a parting plane of the tightening nut.

7. The tensioner according to claim 1, wherein the seat has a contact region for a mating contact region of the tightening nut.

8. The tensioner according to claim 7, wherein the contact region is designed as a seat of the outer sleeve and the mating contact region is formed as a frustoconical surface of the tightening nut.

9. The tensioner according to claim 1, further comprising:
   a spring biasing the tightening nut toward the seat in the outer sleeve by a spring.

10. The tensioner according to claim 9, wherein the spring is braced against a spring sleeve.

11. The tensioner according to claim 10, wherein the spring sleeve is mounted in the outer sleeve so as to be axially displaceable.

12. The tensioner according to claim 9, wherein the spring is compressed between the spring sleeve and a n coupling element.

13. The tensioner according to claim 12, wherein the coupling element is coupled for joint axial movement with both shells.

14. The tensioner according to claim 12, wherein the coupling element engages with respective radial pins in corresponding pin holes of the respective shells.

15. In a tightener for a wire, cable, or the like, a tensioner comprising:
   an externally threaded bolt centered on an axis;
   a pair of substantially semicylindrical shells together forming a tubular nut also centered on an axis and having an internal thread meshable with an external thread of the bolt in a radial inner position of the shells and out of mesh with the external thread of the bolt in a radial outer position, the shells together forming a pair of diametrally opposite axially rearwardly open holes each in turn having a front spreading region tapering together axially forwardly and a rear region extending substantially parallel to the axis;
   an outer sleeve surrounding the nut and the bolt;
   a pair of diametrally opposite pins fixed in the outer sleeve and projecting through the holes, the nut being axially limitedly shiftable in the outer sleeve between a rear position with the pins in the rear region of the holes and the shells in the inner position and a front position with the pins in the front region of the holes and cammed apart into the outer position;
   a forwardly tapered seat in the outer sleeve and a complementary outer surface on the nut fittable in the seat in the front position of the nut;
   a spring braced between the outer part and the nut and biasing the nut into the front position with the threads meshing and the outer surface fitted in the seat, whereby pushing the rod axially rearward moves the nut axially rearward against the spring, with the pins camming the shells apart and the threads disengaging.

16. The tensioner according to claim 15, further comprising:
   a coupling element braced axially between the spring and the nut and axially coupled to the nut.

17. The tensioner according to claim 16, further comprising:
   an inner spring sleeve axially slidable and axially fixable in the outer sleeve, the spring being braced via the inner spring sleeve against the outer sleeve when the inner sleeve is fixed, the inner sleeve being axially rearwardly shiftable when not axially fixed in the outer sleeve to axially rearwardly shift the spring, coupling element and the nut, whereby the nut disengages from the seat and spreads to allow free axial movement of the bolt.

* * * * *